Dec. 29, 1964 C. WOOD ETAL 3,162,932
PROCESS OF MAKING A HALL CRYSTAL
Filed Oct. 21, 1960
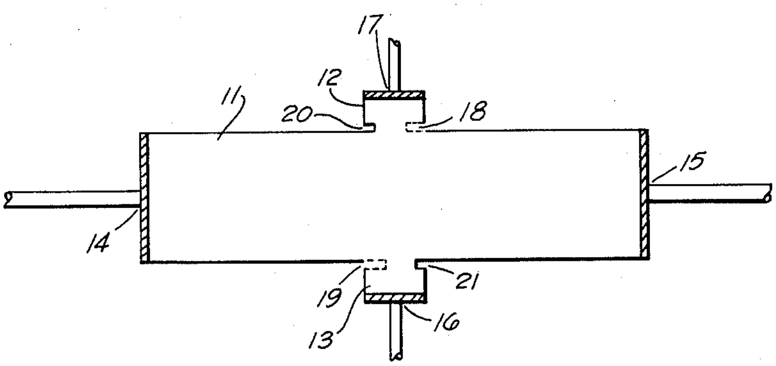
CHARLES WOOD
GEORGE F. SCHROEDER
OSCAR TISCHLER
INVENTORS
BY Andrew L. Bain
George B. Oujevolk
ATTORNEYS 3,162,932
Patented Dec. 29, 1964

3,162,932

PROCESS OF MAKING A HALL CRYSTAL

Charles Wood, Ridgewood, George F. Schroeder, Pines Lake, Wayne Township, and Oscar Tischler, West Caldwell, N.J., assignors to General Precision Inc., Little Falls, N.J., a corporation of Delaware Filed Oct. 21, 1960, Ser. No. 64,174
2 Claims. (Cl. 29—155.5)

The present invention relates to Hall crystals and more particularly to Hall crystals having a zero output in the absence of a magnetic field.

The Hall effect is the development of a transverse electric potential gradient in a current-carrying conductor upon the application of a magnetic field (The International Dictionary of Physics and Electronics, D. Van Nostrand Company, Inc., New York, 1956). The Hall voltage produced by the Hall effect is expressed mathematically as follows:

$$V_H = \frac{10^{-8} R_H I_x B_y}{d}$$

where:

$x$ and $y$ are directions of flow, $d$ is the thickness of the crystal parallel to the B field; and $R_H$ is the Hall coefficient for a particular substance, e.g., a crystal (Shive, The Properties, Physics, and Design of Semiconductor Devices, D. Van Nostrand Company, Inc., New York, 1959).

Since $$\frac{10^{-8} R_H}{d}$$

is a constant for any particular crystal, the Hall effect formula is usually written as $$V_H = KI_x B_y \text{ or simple } V_H = KIB$$

The general formulas relating to the Hall effect have been known for some seventy-five years. However, since the constant K has in the numerator a factor of $10^{-8}$, until recently, no appreciable voltage could be obtained from Hall effect devices. At present several semiconductor crystals are commercially available which will produce a workable Hall voltage. These crystals are usually referred to as Hall crystals. In general, the behavior of these crystals is as mathematically predicted. However, in many cases, it has been found that when a control current is applied to a crystal in the total absence of a magnetic field, a Hall voltage will appear across the Hall output leads, even when the leads are perfectly aligned mechanically.

Although many attempts have been made to provide a Hall crystal which can be used for highly accurate measurements of magnetic fields, because of the problem of zero field voltage, none, as far as we are aware, have ever been successful when put into actual practice without using outside circuitry, e.g., a bucking voltage, to compensate for the error in the crystal.

It has now been discovered that a zero field zero voltage crystal can be produced thus eliminating the problem of outside compensating circuitry and greatly increasing the accuracy of the crystal output.

Thus, it is an object of the present invention to provide a Hall crystal which will have zero Hall voltage in a zero magnetic field.

A further object of the present invention is to provide a rapid and simple way of treating a Hall crystal to produce the foregoing result.

With the foregoing and other objects in view, the invention resides in the novel steps, arrangements, and combinations thereof and in the sequence of steps hereinafter described, it being understood that changes in the precise embodiment of the invention herein disclosed may be made within the scope of what is described without departing from the spirit of the invention.

The invention as well as its many objects and advantages will become more apparent from the following description taken in conjunction with the accompanying drawing in which:

FIGURE 1 illustrates a longitudinal cross-sectional view of a novel-shaped Hall crystal herein contemplated.

Generally speaking the present invention contemplates first making low resistance ohmic control and Hall output contacts to a cruciform-shaped crystal, and then mechanically shaping the crystal so that the electrical misalignment of the Hall output leads approach zero in the absence of a magnetic field.

The conventional Hall crystal is thin and rectangular-shaped. Such a crystal will usually have an output of the order of one millivolt in a zero magnetic field. In carrying the present invention into practice, it is preferred to use a germanium cruciform-shaped crystal 11 shown in FIGURE 1. That is, in addition to the usual rectangular-shaped crystal, there are two wings 12 and 13 at the longitudinal center of the rectangle giving the crystal its cruciform shape. The control current leads are attached to the centers 14 and 15 of the longitudinal ends, and the Hall output leads are affixed to the wing centers 16 and 17. Alloying or soldering techniques may be used to obtain ohmic contacts. The ohmic character of the contacts may be checked by displaying the A.-C. characteristics on an oscilloscope. The Hall output leads are then connected to a microvoltmeter and the output is read. If there is any voltage across the Hall output leads when a control current is applied, one side of the cruciform 18 is cut longitudinally by a sand-blasting unit attached to a micromanipulator. The reading on the voltmeter is watched carefully to see if any increase is shown. If so, the opposed wing 19 of the cruciform is similarly sand-blasted longitudinally and the output checked. As soon as the voltmeter starts to go towards its null position, sandblasting is continued along the particular line until the null is reached. If the minimum point is overshot, the other side 20 and 21 of the cruciform may be similarly machined until a null is reached. Machining by a small diamond drill or a dental drill is also satisfactory. Using the foregoing technique, it is possible to reduce the misalignment voltage from one millivolt to as low as 10 microvolts with a control current of 20 ma. passing through a 0.5 ohm cm. n-type germanium crystal with dimensions of 1 cm.×0.3 cm.×0.025 cm.

The technique just described may also be applied to a conventional rectangular-shaped Hall crystal. In such crystals, the output leads are usually mechanically aligned. One of the transverse ends 23 of the conventional crystal 24 is selected as the starting end. The output leads 25 and **25*a* are connected to a microvoltmeter and one side 26 of transverse end 23 is selected as the starting point and sand-blasted while watching the voltmeter. If the voltage increases, the sand-blasting is immediately stopped, and the corresponding side 26*a* of the opposed transverse end 27 is sand-blasted. This should reduce the voltage and once the voltmeter indicator moves towards the null position, sand-blasting is continued until the null is reached. If the null is passed, opposed sides 28 and 29** may be similarly sand-blasted until the null is reached.

It is to be observed therefore that the present invention provides for a method of treating a Hall crystal having control current leads and Hall voltage output leads, and comprises the steps of machining a portion of the crystal adjacent the output leads while the leads are connected to a voltmeter until a null reading is given by the voltmeter indicator. The invention also provides for an article of manufacture, namely a thin cruciform-shaped crystal having a rectangular main body portion and preferably rectangular wings at the longitudinal center of the sides of the rectangle.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

I claim:

1. The process of making a Hall crystal which will provide a zero Hall voltage output in the absence of a magnetic field, comprising:

providing a Hall crystal of cruciform configuration made up of a rectangular portion having driving current electrodes on its ends, having respective transverse wing portions at substantially the mid-points of the longitudinally-extending side edges of the rectangular portion, and having respective Hall voltage output electrodes on the wing portions;

connecting the output electrodes to a voltmeter;

producing a control current between said current electrodes and, if the voltmeter reading is not substantially at null, cutting said crystal, at the juncture of one of said wing portions and the rectangular portion, along a line parallel to the longitudinal axis of said rectangular portion and continuing said cutting so long as it tends to move the voltmeter reading toward null.

2. The process according to claim 1, including the further steps of discontinuing said cutting step if it causes the voltmeter reading to move away from null and then cutting said crystal at the juncture of the opposite wing portion and said rectangular portion along a line parallel to the longitudinal axis of said rectangular portion.

References Cited by the Examiner

UNITED STATES PATENTS

| | | | |
|---|---|---|---|
| 1,859,112 | 5/32 | Silberstein | 29—155.7 |
| 2,653,378 | 9/53 | Mathews et al. | 29—25.3 |
| 2,657,296 | 10/53 | Brown | 29—155.62 |
| 2,697,269 | 12/54 | Fuller | 29—25.3 |
| 2,725,504 | 11/55 | Dunlap | 317—235 |
| 2,774,890 | 12/56 | Semmelman | 307—88.513 |
| 2,877,394 | 3/59 | Kuhrt | 317—234 |
| 2,945,993 | 7/60 | Kuhrt | 317—234 |
| 2,970,411 | 2/61 | Trolander | 29—155.62 |

JOHN F. CAMPBELL, *Primary Examiner.*

SAMUEL BERNSTEIN, *Examiner.*